United States Patent [19]  [11]  4,410,348
Ito et al.  [45]  Oct. 18, 1983

[54] METHOD FOR COMPOSTING

[75] Inventors: Kanichi Ito, Yokohama; Yoshio Hirayama, Zushi; Ryoichi Takeuchi, Kamakura; Masanori Kodaira, Tokyo; Gorou Iizuka, Fujisawa, all of Japan

[73] Assignee: Ebara Corporation, Tokyo, Japan

[21] Appl. No.: 344,074

[22] Filed: Jan. 28, 1982

Related U.S. Application Data

[63] Continuation of Ser. No. 150,652, May 16, 1980, abandoned.

[30] Foreign Application Priority Data

May 26, 1979 [JP] Japan .................................. 54-65249
Jul. 11, 1979 [JP] Japan .................................. 54-87576

[51] Int. Cl.³ .............................................. C05F 9/04
[52] U.S. Cl. .......................................... 71/9; 422/184; 435/315
[58] Field of Search ......................... 71/9, 8, 12, 13, 6; 435/313, 315, 287; 422/184

[56] References Cited

U.S. PATENT DOCUMENTS 2,798,800 7/1957 Geraghty et al. ................... 71/9 X
3,323,896 6/1967 Brown ..................................... 71/9
3,357,812 12/1967 Snell ....................................... 71/9
3,364,007 1/1968 Redman ............................... 71/9 X
3,438,740 4/1969 Brown ................................... 71/9 X
3,881,707 6/1975 Toto ................................ 23/259.1

FOREIGN PATENT DOCUMENTS 21064 1/1981 European Pat. Off. ................. 71/9
1302793 7/1962 France .
491796 7/1970 Switzerland .
496600 11/1970 Switzerland .
496637 12/1938 United Kingdom .
521894 6/1940 United Kingdom .................... 71/9
543865 3/1942 United Kingdom .................... 71/9

Primary Examiner—Kenneth M. Schor
Attorney, Agent, or Firm—Wenderoth, Lind & Ponack

[57] ABSTRACT

A method and an apparatus are disclosed for composting a relatively large quantity of organic materials with a relatively small agitator adapted to travel in zig-zag path in a generally rectangular heaping zone where the organic materials are piled in a layer.

10 Claims, 24 Drawing Figures

METHOD FOR COMPOSTING

This is a continuation of application Ser. No. 150,652, filed May 16, 1980, now abandoned.

FIELD OF ART

The present invention relates generally to the treatment organic materials such as those discharged as municipal waste, organic sludge or excretions from stock farming and, more particularly, to a method and apparatus for converting such organic materials into compost.

BACKGROUND OF INVENTION

In the conventional process for composting organic materials, the general practice has been to store or pile the organic materials to be composted for a certain period and to periodically turn them over at a proper time interval to promote aerobic fermentation, a proper amount of air being preferably fed to the stored materials from the bottom thereof during the storage which may be omitted if the materials are stored in the open air depending on the conditions such as the local or regional climate or environment. At any rate, an operation for plowing or turning the piled materials over is indispensable in order to uniformly mix the materials as well as to fractionalize the materials so as to substantially increase the total area of the surface of the materials exposed to air.

On the other hand, it is necessary to displace the materials in a predetermined direction simultaneously with the plowing up or turning over operation if the composting operation is to be made continuous.

In an apparatus disclosed in PCT application No. (PCT/JP78/00006) assigned to the Ebara Corporation, the aim was to increase the processing capacity of a multi-stage composting apparatus per unit area required for the installation, and the apparatus has been admitted as satisfactory, for its intended purposes. However, due to its construction, the driving mechanism therefor is complex and the configuration has been limited to a circular base area. Sometimes, this construction may increase the operation cost and/or maintenance cost and may not be proper for use in a place where limitation on the field space is substantially neglegible.

In other conventional type composting systems, an inherent disadvantage is that the necessary agitating and displacing device for performing the continuous composting opertion becomes large as the capacity of the apparatus is increased, since an increase in the amount of materials to be received and stored in the apparatus necesitates an increase in capacity. Such increased capacity also causes an increase in the expense required for installation and maintenance of the apparatus. In view of the facts encountered in the composting apparatus of the prior art, there has been a great and constant need to provide a method and an apparatus which can handle a large quantity relatively economically.

SUMMARY OF THE INVENTION

Accordingly, it is an object of the present invention to provide a method for composting large quantities of organic materials relatively economically.

It is a further object of the present invention to increase the processing capacity of a method for composting organic materials without need of substantially enlarging devices for agitating and/or turning over the materials to be composted.

It is still another object of the present invention to provide a method for effectively fermenting the organic materials in conjunction with displacing and loosening the materials so as to prevent their packing down into a mass for increasing the total area of the materials exposed to air.

According to the present invention, the objects above are satisfactorily accomplished.

The organic materials to be composted are fed to a composting area or zone, the plan view of which is generally a rectangular shape, at an inlet of the composting zone, and are progressively displaced towards a discharge port of the composting zone by a revolving means adapted to travel in a zig-zag fashion within the composting zone so as to loosen or free the materials piled in the composting zone and to incrementally displace the same from the inlet towards the outlet in a zig-zag course of travel. The rotational speed and the travelling speed of the revolving means are selected so that the organic materials are loosened or freed and fed in a direction traversing the zig-zag travelling passage of the revolving means by a distance sufficient to pass beyond the revolving means and are laid on the composting zone again where the materials are deposited rather loosely without packing into a mass whereby aerobic fermentation is not prevented. The revolving means above, thus, effects simultaneously agitation and displacement of the materials to be composted and travels substantially over the entire surface of the composting zone. Due to such arrangement, the capacity of the composting apparatus may to be increased without making the mechanism for displacing and agitating the materials substantially-large in size. Such increase of capacity is also achieved economically.

The present invention will be made more clear from the following detailed description of the invention referring to the accompanying drawings briefly summarized below.

DETAILED DESCRIPTION OF THE PREFERRED EMBODIMENTS

Figure 1:
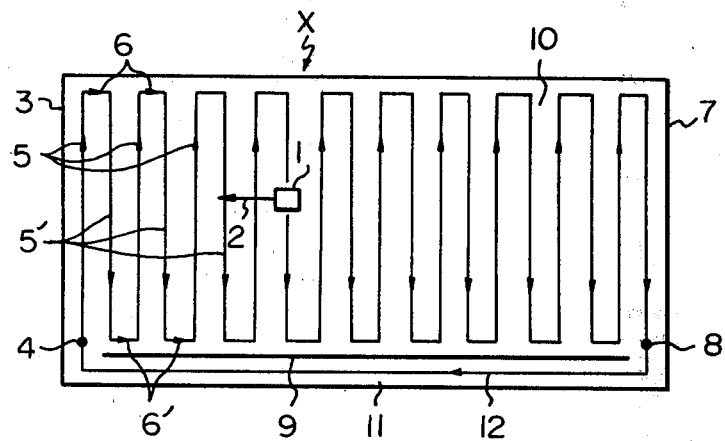
FIG. 1 is a schematic plan view showing a basic locus which is traced by an agitator according to the present invention.

In FIG. 1, there is shown a schematic drawing of a plan view for illustrating a principle of the present invention. The composting process is carried out over an area or zone X of a generally rectangular shape. An agitating device 1 is arranged to be movable in the zone X while it is given a function to displace organic materials to be composted in a direction illustrated by an arrow 2. Assuming that the organic materials are laid to cover the entire zone, the device 1 may start its movement from a starting point 4 adjacent a discharge end 3 and travels zig-zag in the directions indicated by arrows 5 and 5' traversing the displacement direction 2 and arrows 6 and 6' parallel to the direction 2. When the agitation device 1 reaches a terminal point 8 adjacent a supply or feed end 7, all the materials have been displaced in the direction of arrow 2 by a distance of displacement effected by one passage of the agitating device 1 in a direction parallel to arrows 6 or 6'. Upon reaching the terminal point 8, the agitating device 1 will return along a path 11 in a direction indicated by arrow 12, which is separated from a fermentation path 10 in the zone X by a partition wall 9 so as to be free of composting materials, and again reaches the starting point 4. The partition wall 9 may be omitted provided that a mechanism is associated with the device 1 for lifting the agitating means upwardly above the height of the composting materials piled or deposited in the zone X so as to clear the agitating means from the composting materials while the device is returning from the point 8 to the point 4.

Figure 2:
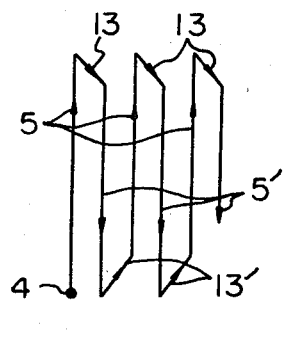
FIG. 2 is a partial schematic plan view of locus slightly different from that shown in FIG. 1.
Figure 3:
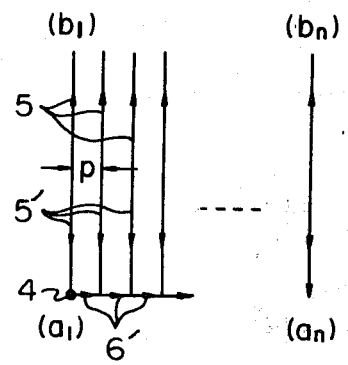
FIG. 3 is a partial schematic plan view of another locus different from those in FIGS. 1 and 2.

There may be another locus or loci of movement or travel of the device 1. Examples of such locuses are illustrated in FIGS. 2 and 3. In FIG. 2, the locus is shown in case the travel of the device follows in a direction of resultant vectors of the material displacement and those parallel and normal to the displacement. Such directions are shown as arrows 13 and 13' in FIG. 2 in place of the arrows 6 and 6' in FIG. 1. In FIG. 3, the device travels on the same path as indicated by overlapped arrows 5 and 5' and advances toward the feed end by a distance equal to a pitch of the zig-zag along the arrow 6' without travelling along the arrow 6 shown in FIG. 1.

Figure 4:
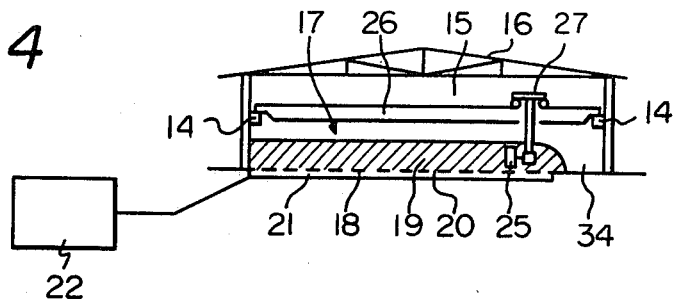
FIG. 4 is a cross sectional view of a shelter in which a composting operation is performed according to the present invention.
Figure 5:
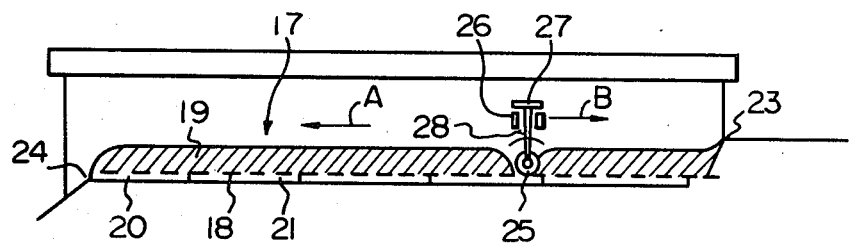
FIG. 5 is another cross sectional view of the shelter shown in FIG. 4 taken in a direction perpendicular to the plane of FIG. 4.
Figure 6:
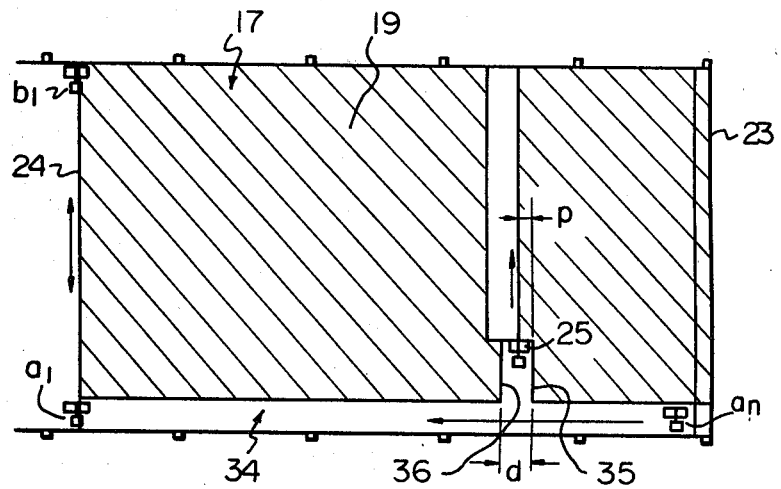
FIG. 6 is a schematic plan view of the embodiment shown in FIGS. 4 and 5.

Referring to FIGS. 4, 5 and 6, there is shown an embodiment of the present invention in which a composting operation is performed indoors. A fermenting chamber 15 is enclosed within or covered by a shelter 16, and a compost material heaping or depositing zone 17 of a generally rectangular shape is provided on a floor 18 of the shelter. The materials before the composting operation, under the fermentation and after the fermentation are heaped in the zone 17 as a piled layer 19. The floor 18 of the zone 17 is provided with a plurality of perforations 20 through which air is injected upwardly from an air chamber 21 below the floor 18 so as to promote the aerobic fermentation, the air chamber 21 being connected to an air source 22. One of the edges of the rectangular heaping zone 17 is adapted to receive organic materials to be composted and, for convenience, it is referred to as a material charging or inlet port 23 and the edge opposite the port 23 is a discharge or outlet port 24 for discharging the fermented materials outwardly. Between the ports 23 and 24, the materials are advanced or displaced in the direction of arrow A from the inlet port 23 towards the outlet port 24 by a revolving means illustrated as an agitator 25 which is adapted to travel a zig-zag course as illustrated in FIGS. 1, 2 and 3.

In order to have the agitator 25 travel a zig-zag course, a carriage 26 is provided to move back and forth over the floor 18 and between the ports 23 and 24. The carriage 26 extends transversely to the direction A and is movably supported at opposite ends by a pair of guide rails 14 mounted on the side walls or columns of the shelter 16. The carriage 26 is adapted to movably support a carrier 27 which is arranged to run on the carriage 26 in the lengthwise direction thereof. The carrier 27 suspends the agitator 25 so that the agitator 25 may follow the zig-zag path when the carriage 26 moves intermittently and incrementally in a direction B opposite to the direction A and continuously in the direction A, and the carrier moves transversely to the directions A and B on the carriage 26 while the movement of the carriage is stopped.

The agitator 25 now will be described together with its accompanying elements and/or cooperating elements referring to FIGS. 7, 8 and 9. The agitator 25 is suspended by an arm 28 at a lower portion thereof which extends downwardly from the carrier 27. The agitator 25 comprises a rotatable shaft 29 extending parallel to the moving direction of the carrier or the longitudinal direction of the carriage 26, a plural number of scraper blades 30 radially mounted on the shaft 29 and a motor 31 for rotatably driving the shaft 29. The rotation of the scraper blades 30 scrapes up the piled layer 19 of the organic materials and sends the materials flying in a direction S shown in FIG. 8 so that the scraped materials are displaced in the direction of A opposite the direction of B. Therefore, the position of the agitator 25 is adjusted so that the bottom of the circumscribed circle of the tips of the scraper blades 30 is slightly above the floor 18. A motor 32 is provided for effecting the movement of the carrier 27 on the carriage 26, and a motor 33 is provided for effecting the intermittent or continuous movement of the carriage 26.

Referring back to FIGS. 4 and 6, a return path 34 is provided adjacent the heaping zone 17 in order to facilitate the return movement of the agitator 25, the path 34 being arranged to be substantially free from the organic materials of piled layer 19. Thus, the path 34 is substantially the same as the path 11 in FIG. 1 and a partition wall (not shown) similar to 9 shown in FIG. 1 may also be provided between the path 34 and the zone 17. The path 34 is naturally made wide enough to allow the movement of the agitator therealong without interference.

Figure 7:
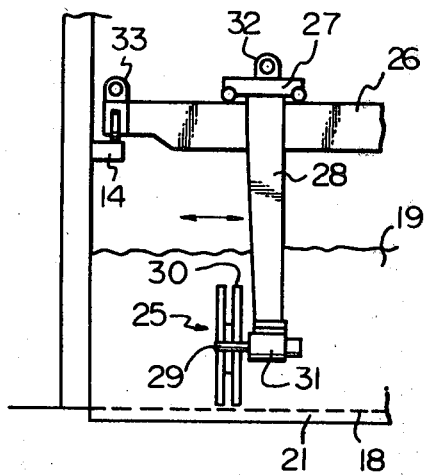
FIG. 7 is a partial view of FIG. 4 showing the components of the agitator and its accompanying elements serving to have the agitator travel in a zig-zag path.
Figure 8:
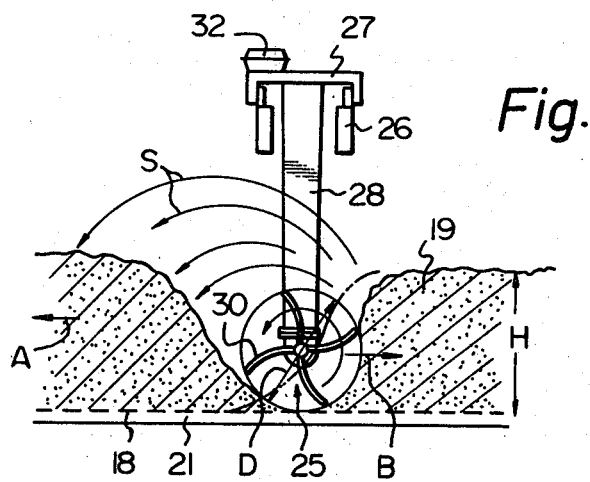
FIG. 8 is a side view of the portion shown in FIG. 7 and illustrates the operational mode of the agitator.
Figure 9:
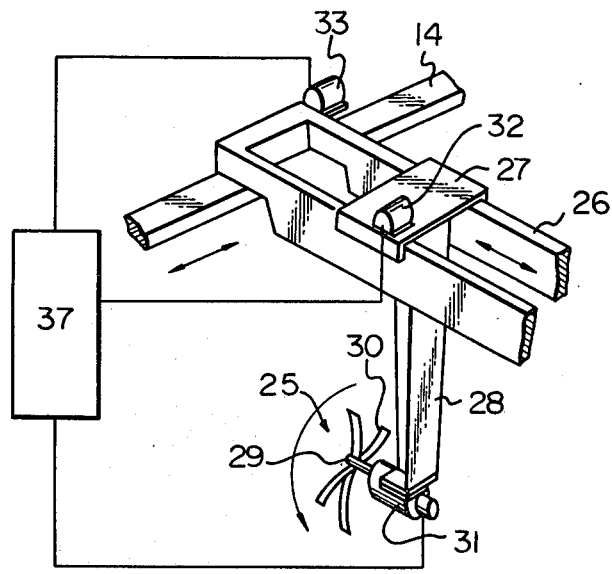
FIG. 9 is a perspective view of the agitator and its components shown in FIGS. 7 and 8.

The operation of the embodiment illustrated in FIGS. 4 through 9 is performed in a manner substantially the same as that illustrated in FIG. 3. Assuming that the piled layer 19 of the organic materials covers the entire surface area of the heaping zone 17, some part thereof having been already completely fermented and the other part thereof being under fermentation, the agitator 25 is arranged to commence its zig-zag course at a point "$a_1$" shown in FIG. 6 which corresponds to the point 4 in FIG. 3. With initiation of the revolution of the agitator 25 as schematically shown in FIGS. 8 and 9, the carrier 27 is also initiated to move on the carriage 26 from the side of the point "$a_1$" toward a point "$b_1$" opposite the point "$a_1$" and thence back again to the point "$a_1$" while the movement of the carriage in the direction B is suspended during the back and forth movement of the carrier 27 between the points "$a_1$" and "$b_1$" corresponding to the first travel passage shown at the left end line in FIG. 3. During the reciprocal movement of the carrier 26 from the point "$a_1$" to the point "$b_1$" composted organic materials are displaced in the direction of A toward the outlet port 24. When the movement of the carrier is between the points "$a_1$" and "$b_1$" the displaced fermented materials are discharged outwardly through the outlet port 24. Upon the return of the carrier 27 with the agitator 25 to the point "$a_1$", the carriage 26 is incrementably advanced in the direction B toward the inlet port 23 by a distance "p" and thence the carrier 27 and agitator 25 are again moved reciprocately along the lengthwise direction of the carriage 26 traversing the direction A or B, and such travel of the agitator 25 is repeated until the agitator reaches the final point "$a_n$" after traveling the locus illustrated in FIG. 3 as the reciprocating paths $a_1 \leftrightarrow b_1$, $a_2 \leftrightarrow b_2$, --- $a_n \leftrightarrow b_n$ with the additional movement of the paths 6'. The distance of the pitch "p" is determined to be equivalent to the dimention of the rotating scraper blades 30 proper for penetrating into the piled layer 19 for displacing the piled layer in the direction A. By the zig-zag course of the agitator from the starting point "$a_1$" to the terminal point "$a_n$", the piled layer is displaced as a whole by a distance equivalent to the mean value "d" of the displacement of the materials scraped from the intermediate edge line 35 of the piled layer to be penetrated by the blades 30 to the intermediate edge line 36 of the layer of the materials thrown and re-piled on the floor by the rotation of the agitator as shown in FIG. 8. The agitator 25 is returned to the starting point "$a_1$" and the operation above is repeated. During the operation above, new organic materials are also charged through the inlet port in an appropriate amount to keep the operation continuous. In other words, the amount of the organic materials equivalent to that displaced by one transverse movement of the agitator must be charged through the inlet port 23 per one complete zig-zag course of the agitator 25 to keep the operation continuous. The actuations of the respective motors 31, 32 and 33 are controlled by a control unit 37 (FIG. 9) accompanied by position responsive means such as limit switches or timing means well known in the art. Although the operation above has been described as starting from the starting point "$a_1$", since, after the commencement of the compositing operation, the entire surface of the heaping zone is generally covered by a layer of the materials to be worked or which have been worked, the operation may be started at an intermediate position between the inlet and outlet ports 23 and 24. Of course, the operation may start from the point "$a_n$" at the initial time or after the heaping zone 17 is completely emptied.

Figure 10:
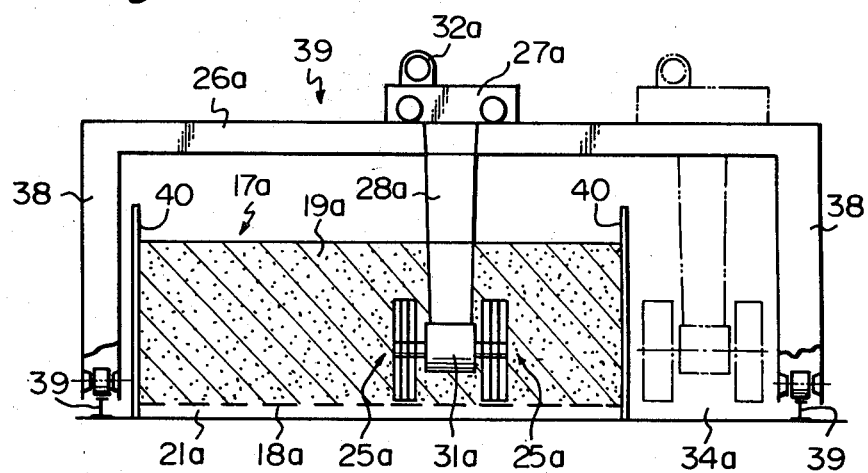
FIG. 10 is a sectional view of another embodiment of the present invention for effecting the zig-zag travel of the agitator.
Figure 11:
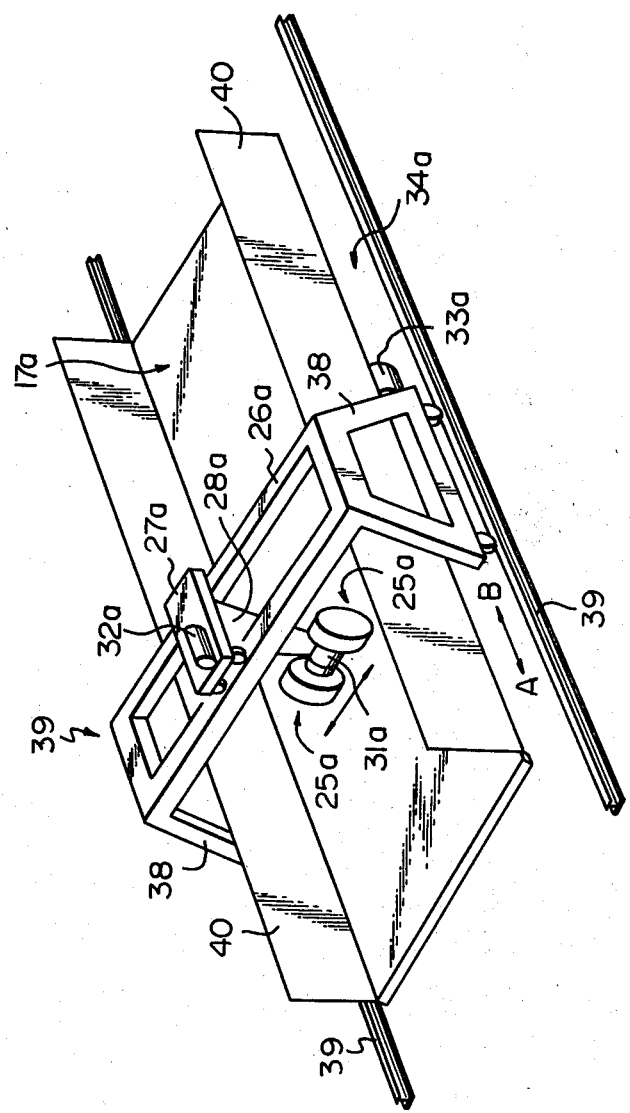
FIG. 11 is a perspective view of the embodiment shown in FIG. 10.
Figure 12:
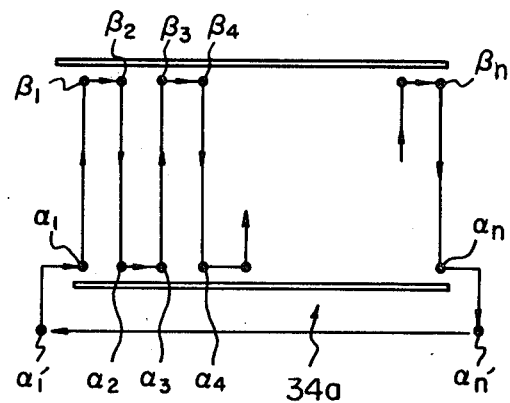
FIG. 12 is a schematic plan view of locus to be traced by the agitator shown in FIGS. 10 and 12.

In FIGS. 10 and 11, another embodiment of the present invention is illustrated which is adapted to be used indoors as well as outdoors. The elements similar to those in the first embodiment of FIGS. 4 through 9 with respect to the functions thereof are given with the same reference numerals as those in the first embodiment, with a suffix "a" added to each thereof. A carriage beam 26a equivalent to the carriage 26 in the first embodiment is provided with a pair of supporting legs 38 at the opposite ends thereof to form a structure resembling a gateway 39. The gateway structure 39 is arranged to move in the direction A or B on a pair of floor or ground rails 39 extending transversely of the longitudinal direction of the carriage beam 26a. In this embodiment, it is noted that agitators 25a are disposed at opposite sides of an arm 28a so as to be driven by a motor 31a interposed therebetween. By such an arrangement, the agitators 25a may be operable in either of the moving directions in which a carrier 27a travels. Thus, a locus of the travel of the agitators 25a may be made similar to that shown in FIG. 1. More specifically, the travelling locus of the agitators 25a is schematically illustrated in FIG. 12. As shown in FIGS. 10 and 11, a heaping zone 17a in this embodiment is provided with a pair of side walls 40 and one of the side walls 40 and one of the supporting legs 38 provide a return track path 34a therebetween. Due to the provision of the side wall 40, The locus of the travel illustrated in FIG. 12 is somewhat different from that shown in FIG. 1. In FIG. 12, a starting point $\alpha_1$ is shifted from a last point $\alpha_1'$ in the return path 34a to clear the side wall. Also, for the same reason, a starting point $\alpha_n'$ in the return path 34 is displaced from the last point $\alpha_n$ of the agitating travel locus. The agitating travel of the agitators 25a commences at the point $\alpha_1$ and thence follows the zig-zag path as $\alpha_1 \rightarrow \beta_1 \rightarrow \beta_2 \rightarrow \alpha_2 \ldots \beta_n \rightarrow \alpha_n$ and moves to the point $\alpha_n'$ and repeats the operation explained. The operation following the locus illustrated in FIG. 12 saves time compared to that required in the first embodiment where agitator 25 is not driven or rotated while it travels backward after it has displaced the organic materials during its travel in the direction "$a_i$" to "$b_i$" in FIGS. 3 and 6.

Figure 13:
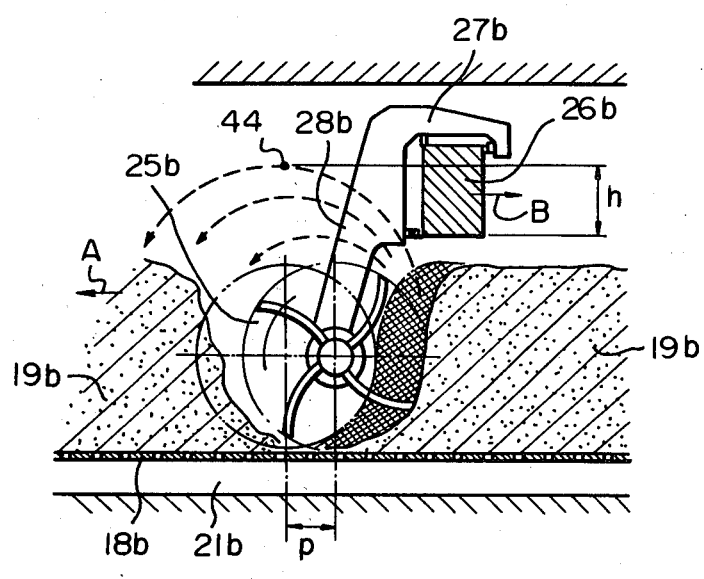
FIG. 13 is an illustration of another agitator in motion together with its related elements.
Figure 14:
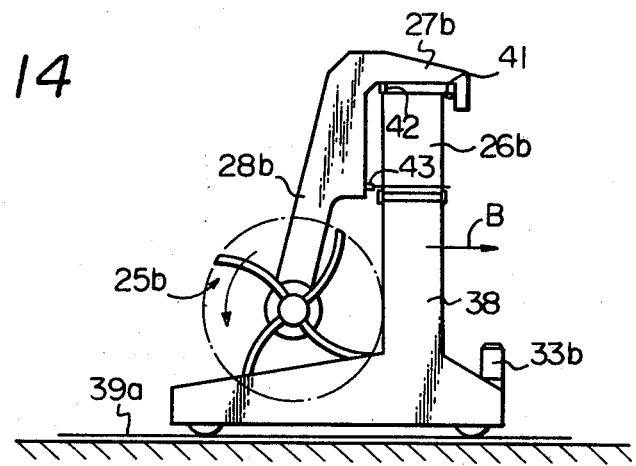
FIG. 14 is a side view of the embodiment shown in FIG. 13.

In FIGS. 13 and 14, a third embodiment according to the present invention, is shown which is similar in function, to the second embodiment. In this embodiment, the elements and/or portions similar to those of the first embodiment are given the same reference numerals as in the first embodiment except that after each of the reference numerals the suffix "b" is added.

In this embodiment, in contrast to the construction of the second embodiment (FIGS. 10 and 11), a carrier 27b is combined with a downwardly extending arm 28b so that the arm 28b extends diagonally in the direction A as shown in FIGS. 13 and 14. The arm 28b supports an agitator or agitators 25b at its lower end and, thus, the combination of the carrier 27b, arm 28b and the agitator(s) 25b imposes loads on the carriage beam 26b not only in a vertical direction by gravity but also in a pivoting direction by movement of a force due to the diagonal or canted arrangement of the arm 28b. Accordingly the combination above is movably supported on the surface of the carriage beam 26b at three points 41, 42 and 43 so as to resist the gravity and the moment of the pivoting force. By the arrangement of the third embodiment, organic materials sent flying in the direction of the arrows in FIG. 13 by the rotation of the agitator(s) 25b are prevented from interferring with the transversely extending carriage beam 26b, thereby making it possible to lower the height of the under sidesurface of the beam 26b by a distance "h" below a highest point of 44 where thrown materials may reach or to send the materials flying higher. If the height of the beam 26b is lowered, the installation cost is also made economical, and particularly so if it is used indoors since the ceiling height of the shelter may be lowered. On the other hand, if the materials are sent flying higher, the diplacing distance of the materials is increased which, depending on the conditions, promotes efficiency or increases the processing capacity. The construction shown in FIGS. 13 and 14 provides the further advantage that, if the inclination of the arm 28b is determined in connection with the penetrating pitch "p" of the agitator 25b so that the arm 28b itself may not interfere with the piled layer 19b during the transverse movement of the carrier 27b and the arm 28b, provision of the agitator 25b only at one side of the arm 28a in a manner similar to that shown in FIG. 9 may present the possibility of following the locus represented in FIG. 12 thereby saving time compared to the locus of travel illustrated in FIG. 3.

Figure 15:
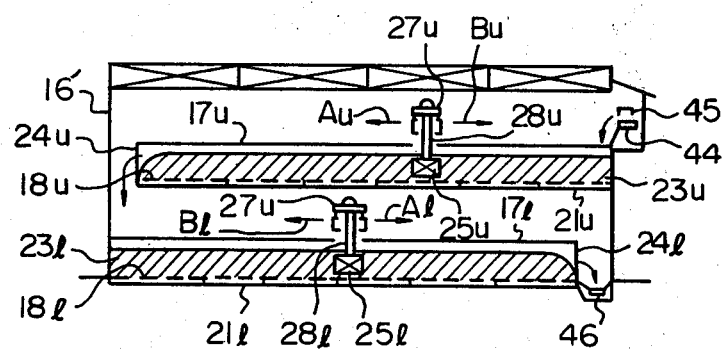
FIG. 15 is a cross sectional view of a two-story shelter similar to that shown in FIG. 4.
Figure 16:
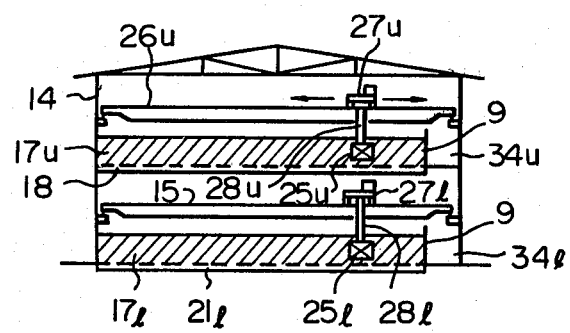
FIG. 16 is a cross sectional view of the shelter shown in FIG. 15 taken along a direction perpendicular to the plane of FIG. 15.
Figure 17:
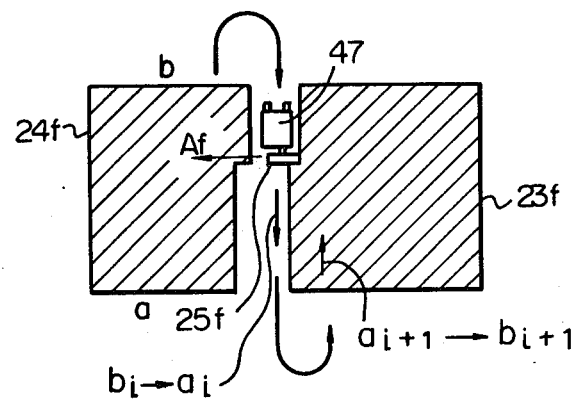
FIG. 17 is a schematic plan view of a heaping zone suitable for use in the open air.

If for some reason it is desired to increase the capacity per unit area required for the installation, for example, for the area is limited, a plurality of composting floors may be provided as a multi-staged shelter. Such an example is illustrated in FIGS. 15 and 16 as a two two-story shelter 16'. In this fourth embodiment of the present invention, the components and elements similar in function to those in the first embodiment (FIGS. 4 through 9) are given the same reference numerals as those corresponding thereto in the first embodiment except that the suffix "u" or "l" is added to each thereof in the upper and lower floors, respectively. Therefore, the operation of the apparatus shown in FIGS. 15 and 16 will be self-explanatory when the previous explanation of the first embodiment is referred to in connection with the brief explanation noted below on the portions peculiar to the fourth embodiment. The organic materials to be composed are delivered by a conveyor belt 44 and charged to an upper heaping zone 17u through an inlet port 23u by distributor 45 adapted to distribute the conveyed materials evenly along the width of the inlet port 23u. The materials piled in the upper heaping zone are turned over and displaced in a direction Au by an agitator 25u during the zig-zag course thereof on an upper floor 18u. The materials thus displaced gradually fall through an outlet port 24u onto a lower floor 18l at its inlet port 23l from where the materials are further turned over or plowed up and gradually displaced toward an outlet port 24l by an agitator 25l during the zig-zag course thereof on lower floor 18l and are discharged onto a discharging conveyor 46. While the shelter 16' has been explained as a two staged shelter, it is to be noted that the number of floors may be increased and it is not limited to two as illustrated.

Figure 18:
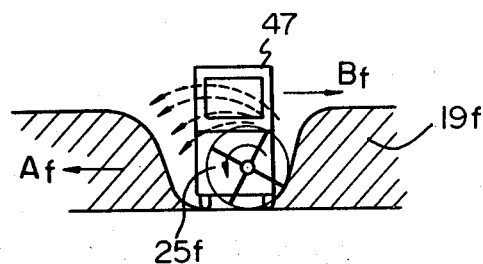
FIG. 18 is a side view of an agitator carried on a vehicle and adapted for use in the heaping zone shown in FIG. 17.
Figure 18A:
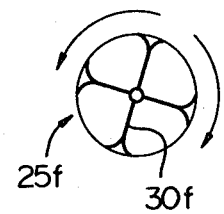
FIG. 18a is a simplified side view of the agitator used in the zone shown in FIG. 17.

In FIGS. 17, 18, 18a, 18b and 19, there is illustrated a still further or fifth embodiment of the present invention which is utilized for composting materials piled in the open air or in a field. In this embodiment, the organic materials are agitated and gradually displaced in a direction of $A_f$ from an inlet side 23f toward an outlet side 24f by an agitator 25f during its zig-zag movement such as the movement following a path $b_i \rightarrow a_i \rightarrow a_{i+1} \rightarrow a_{i+1} \ldots$. The agitator 25f is preferably carried by a vehicle 47 which may be movable to trace the above path. Since the materials are piled in the field, the vehicle 47 may freely turn its direction at a position outside of the composting zone as indicated by the curved arrows. Therefore, the rotational direction of the agitator 25f is to be changed to the opposite direction at each turning of the vehicle. In compliance with such change of rotational direction, each of the tips of the scraper blades 30f in the agitator 25f is shaped to have a "Y" shape as schematically illustrated in FIG. 18a so that it may scrape a piled layer 19f efficiently irrespective of the rotational directions thereof. Incidentally, it is noted that each of the scraper blades in the foregoing embodiments are given a curvature, so that each blade may scrape the piled organic materials efficiently since it is unnecessary in those embodiments to reverse the rotational direction. The vehicle 47 may take the form of an automobile and, thus, it is preferable to rotate the agitator 25f by utilizing a power take out shaft extended from its engine in lieu of the separate motors of the previous embodiments.

Figure 18B:
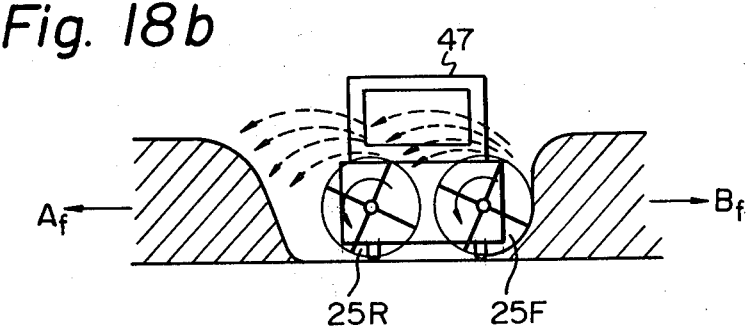
FIG. 18b is a modified version of the device shown in FIG. 18.
Figure 19:
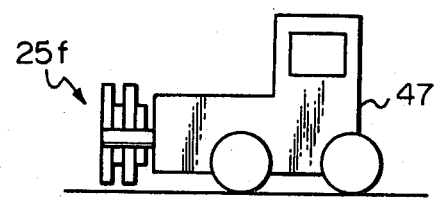
FIG. 19 is a front view of the agitator shown in FIGS. 18 or 18a together with its carrying vehicle in a side view.

In FIG. 18b, there is shown an illustration similar to that shown in FIG. 18 except that the vehicle 47 is equipped with a front agitator 25F and a rear agitator 25R. The rear agitator 25R further throws the materials sent by the forward agitator 25F and promotes breaking up or fractionizing of the organic materials.

Figure 8A:
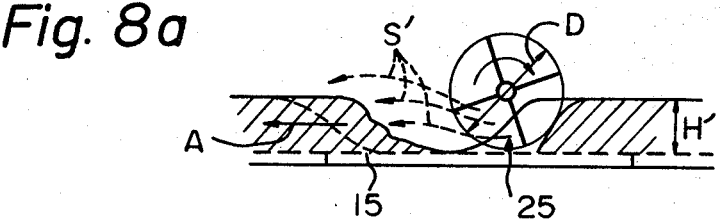
FIG. 8a is an illustration similar to that shown in FIG. 8 but wherein the agitator is oppositely rotated relative to the mode shown in FIG. 8.
Figure 20:
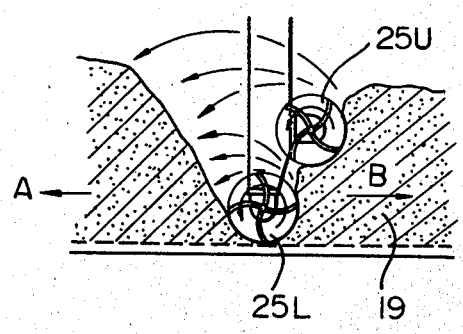
FIG. 20 is a further modified view of agitating means according to the present invention wherein an upper agitator and a lower agitator are employed.

Now the operation of the agitator will be reviewed. For convenience, FIGS. 8 and 9 are referred to again. While the movement of the carriage beam 26 in the direction of B is suspended, the agitator 25 is rotated in the direction of the arrow as indicated and traversed in a direction along the longitudinal direction of the beam 26. The height "H" of the piled layer 19 is preferably more than half the outer diameter "D" of the scraper blades 30 or it is further preferably more than the value of the outer diameter "D" so that the organic materials are sent flying in the direction of arrows S in FIG. 8 to pass beyond the agitator 25 in the direction A, assisted by the blocking effect afforded by the edge of the piled layer deposited in such layer or thickness. The blades 30 penetrate the piled layer 19 of the materials, scrape off and send or throw the same flying and, therefore, the materials are divided, or broken up so as to remarkably increase the total surface area of the thrown materials which are gently deposited on the floor 18 without packing down into a mass, whereby resistance to air blown upwardly through the piled materials is kept low to facilitate and promote aerobic fermentation. If the height H' of the piled layer 19 is less than half of the outer dimeter "D" of the agitator scraper blades 30 such as shown in FIG. 8a, the rotation of the agitator 25 is preferably reversed as schematically shown in FIG. 8a wherein the scraped off materials are sent or thrown in the direction S' passing the region where the agitator is traversing in a direction normal to the direction A and are gently piled with displacement in the same direction as A. In order to provide the operational versatility of the agitator 25, the blades shaped such as illustrated in FIG. 18a may be employed if necessary. If the materials are piled high for some reason, such as to increase the quantity of materials processed per unit area, an additional agitator may be provided above the agitator disposed adjacent the floor. Such an arrangement is schematically illustrated in FIG. 20 wherein two agitators, namely an upper agitator 25U and a lower agitator 25L, are arranged to move in a direction vertical to the plane, of the illustrated drawing while they are rotated in the direction of the arrows. The agitators 25U and 25L are also adapted to intermittently advance in the direction B towards an inlet port of the materials so that they are moved to trace a zig-zag path. It is preferable to arrange the upper agitator 25U slightly forward relative to the lower agitator 25L with respect to the advancing direction B in order to allow each of the agitators to penetrate properly into the layer of materials. Also, it is preferably to arrange the circumferential speed of the upper agitator 25U greater than that of the lower agitator 25L so that the scraped materials are thrown farther by the upper agitator 25U than by the lower agitator 25L.

Figure 21:
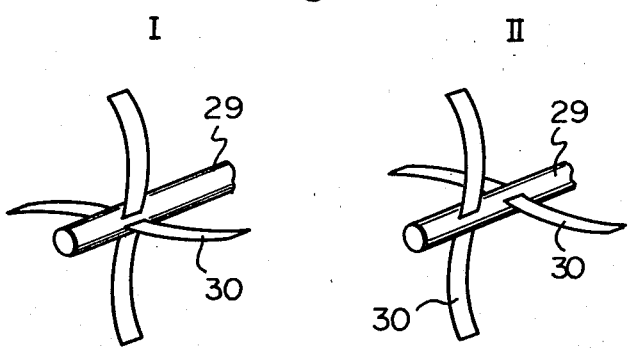
FIG. 21 is an explanatory drawing illustrating the mounting of scraper blades on the shaft.

In FIG. 21, the arrangement of the scraping blades 30 is illustrated to correspond to the agitator shown in FIGS. 7, 8 and 9. In the FIG. 21(I), the blades 30 are radially mounted on the shaft 29 in the same axial position whereas, in FIG. 21(II), the blades 30 are mounted on the shaft 29 in an axially staggered relationship. The number and the axial position of the blades are not limited to those illustrated in the drawings and they may be modified as required. It is also preferable to construct the mounting of the blades so replacement thereof is easy.

The present invention has been explained in detail referring to the accompanying drawings. However, the invention is not limited to the embodiments illustrated in the accompanying drawings, and modification and changes apparent to those skilled in the art are within the spirit and scope of the present invention which is defined in the claims appended hereto.

What is claimed is:

1. A method for composting organic materials, said method comprising:
   providing a layer of organic materials to be composted in a generally rectangular zone including first and second spaced parallel side edges and first and second parallel end edges;
   providing proper temperature, moisture, aeration and microorganism content for said layer of organic materials, to compost said layer of organic materials;
   positioning an agitator adjacent said first end edge and said first side edge, and rotating said agitator in a manner to scrape a predetermined width of said materials from said layer in a first direction parallel to said side edges and to throw the thus scraped materials upwardly above said layer in a second direction opposite to said first direction, such that the thus thrown materials fall back down to reform the layer in a loose and non-packed manner;
   traversing said agitator from said first side edge to said second side edge in a third direction transverse to said first and second directions, while continuing rotation of said agitator, thereby scraping and throwing a band of said material of said predetermined width adjacent said first end edge;
   thereafter returning said rotating agitator from said second side edge to said first side edge by traversing said agitator in a fourth direction parallel to said third direction, and repeating said operations of traversing said rotating agitator in said third and fourth directions, which periodically shifting said agitator in said first direction by incremental distances equal to said predetermined width, until said agitator has reached said second end edge and said entire layer has been scraped and thrown in incremental said bands of said predetermined width; and
   returning said agitator from said second end edge to said first end edge and repeating said above operations as the materials are composting.

2. A method as claimed in claim 1, further comprising sequentially charging new organic materials to be composted into said zone through an inlet extending along said second end edge, while said materials of said layer are sequentially displaced by said agitator in said second direction toward an outlet from said zone extending along said first end edge.

3. A method as claimed in claim 2, wherein said materials of said layer are displaced from said inlet to said outlet by movement of said agitator in a zig-zag path throughout said entire layer from said first end edge to said second end edge.

4. A method as claimed in claim 1, comprising shifting said agitator in said first direction after each said traversing operation.

5. A method as claimed in claim 1, comprising shifting said agitator in said first direction only after each said operation of traversing said agitator in said fourth direction.

6. A method as claimed in claim 1, comprising returning said agitator from said second end edge to said first end edge along a passage located outside said zone.

7. A method as claimed in claim 1, comprising positioning said layer on a floor having a plurality of perforations, and injecting air upwardly through said perforations into said layer.

8. A method as claimed in claim 1, comprising conducting said scraping and throwing by means of a plurality of scraper blades mounted substantially radially on an agitator shaft extending horizontally and transverse to said first and second directions, and rotating said shaft and said blades.

9. A method as claimed in claim 8, wherein the height of said layer is greater than one-half the outer diameter of said scraper blades.

10. A method as claimed in claim 9, wherein said height of said layer is greater than said diameter of said scraper blades.

* * * * *